United States Patent
Suzuki et al.

(10) Patent No.: US 8,742,724 B2
(45) Date of Patent: Jun. 3, 2014

(54) BATTERY PACK FOR POWER TOOL, AND POWER TOOL

(75) Inventors: Hitoshi Suzuki, Anjo (JP); Tadahiko Kobayakawa, Anjo (JP); Tomoo Muramatsu, Anjo (JP)

(73) Assignee: Makita Corporation, Anjo-Shi (JP)

(*) Notice: Subject to any disclaimer, the term of this patent is extended or adjusted under 35 U.S.C. 154(b) by 467 days.

(21) Appl. No.: 12/588,006

(22) Filed: Sep. 30, 2009

(65) Prior Publication Data

US 2010/0085010 A1    Apr. 8, 2010

(30) Foreign Application Priority Data

| Oct. 8, 2008 | (JP) | 2008-261825 |
| Nov. 10, 2008 | (JP) | 2008-287765 |
| Jan. 8, 2009 | (JP) | 2009-002596 |
| Jan. 16, 2009 | (JP) | 2009-007664 |

(51) Int. Cl.
  *H02J 7/00* (2006.01)
(52) U.S. Cl.
  USPC .............. 320/132; 320/112; 320/113; 310/50
(58) Field of Classification Search
  USPC ............ 320/132, 112, 113, 114, 107; 310/50; 173/214
  See application file for complete search history.

(56) References Cited

U.S. PATENT DOCUMENTS

| 4,965,738 A | 10/1990 | Bauer et al. |
| 5,872,444 A | 2/1999 | Nagano et al. |
| 5,905,362 A | 5/1999 | Nagano et al. |
| 6,008,620 A | 12/1999 | Nagano et al. |
| 6,191,554 B1 * | 2/2001 | Nakane et al. ............... 320/114 |
| 6,208,117 B1 | 3/2001 | Hibi |
| 6,225,783 B1 | 5/2001 | Nagano et al. |
| 6,268,710 B1 * | 7/2001 | Koga ........................... 320/116 |
| 6,924,624 B2 | 8/2005 | Baur et al. |
| 7,492,124 B2 | 2/2009 | Johnson et al. |

(Continued)

FOREIGN PATENT DOCUMENTS

| EP | 0 978 923 A2 | 2/2000 |
| EP | 1 746 702 A2 | 1/2007 |

(Continued)

OTHER PUBLICATIONS

European Search Report in European Patent Application No. 09012648.3; dated Sep. 2, 2010.

(Continued)

*Primary Examiner* — Yalkew Fantu
(74) *Attorney, Agent, or Firm* — Oliff PLC

(57) ABSTRACT

A battery pack for power tool includes a battery, a monitoring circuit, and a sleep mode switching unit. The battery includes at least one battery cell. The monitoring circuit is operated by receiving power supply from the battery. The sleep mode switching unit switches the battery pack to a sleep mode by stopping at least a part or all of operations of the monitoring circuit when the monitoring circuit detects a discharge end state where a discharge current from the battery is equal to or lower than a predetermined set current value, and the monitoring circuit further detects at least one of a voltage stable state where a voltage change amount in the battery cell is within a predetermined stable range of voltage change amount and a temperature stable state where a temperature change amount in the battery is within a predetermined stable range of temperature change amount.

15 Claims, 6 Drawing Sheets

(56) References Cited

U.S. PATENT DOCUMENTS

| | | | |
|---|---|---|---|
| 7,714,538 B2* | 5/2010 | Johnson et al. | 320/114 |
| 2005/0280393 A1* | 12/2005 | Feldmann | 320/114 |
| 2006/0118315 A1* | 6/2006 | Suzuki et al. | 173/2 |
| 2006/0180327 A1 | 8/2006 | Nagasaka et al. | |
| 2006/0214627 A1 | 9/2006 | Ito et al. | |
| 2006/0220605 A1 | 10/2006 | Funabashi et al. | |
| 2008/0238370 A1* | 10/2008 | Carrier et al. | 320/134 |

FOREIGN PATENT DOCUMENTS

| | | |
|---|---|---|
| JP | A 9-285026 | 10/1997 |
| JP | A-2001-045670 | 2/2001 |
| JP | A 2003-264008 | 9/2003 |
| JP | A 2006-218605 | 8/2006 |
| JP | A 2006-280043 | 10/2006 |
| JP | A-2006-281404 | 10/2006 |
| JP | A 2007-82379 | 3/2007 |
| WO | WO 98/02933 A1 | 1/1998 |

OTHER PUBLICATIONS

Russian Office Action dated Apr. 20, 2012 in Russian Patent Application No. 2009137184 (with translation).

Dec. 15, 2011 Office Action issued in Russian Patent Application No. 2009137184 (with English translation).

Feb. 5, 2013 Office Action issued in Japanese Patent Application No. 2009-002596 (with English Translation).

* cited by examiner

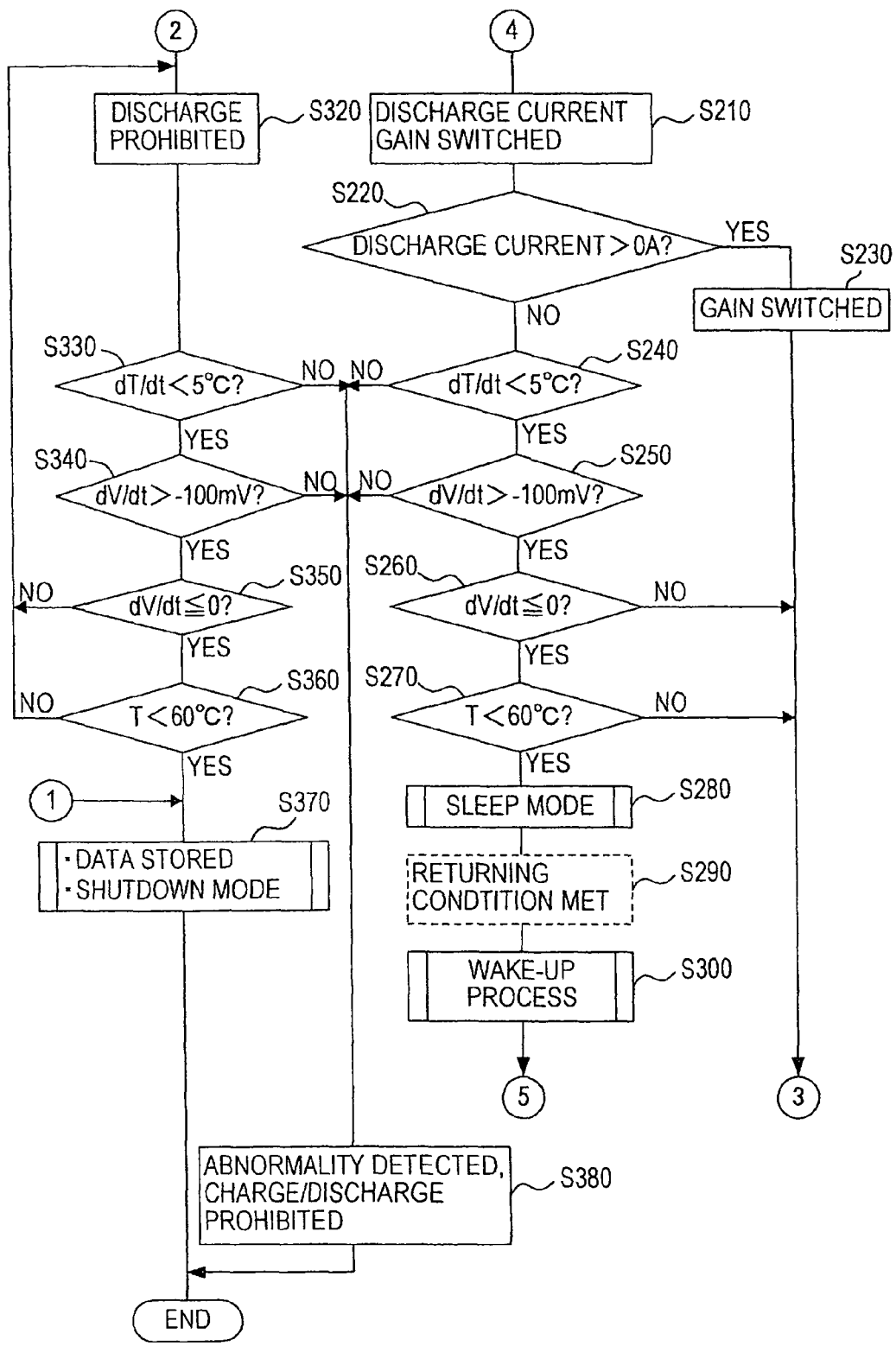

BATTERY PACK FOR POWER TOOL, AND POWER TOOL

CROSS-REFERENCE TO RELATED APPLICATIONS

This application claims the benefit of Japanese Patent Applications No. 2008-261825 filed Oct. 8, 2008, No. 2008.287765 filed Nov. 10, 2008, No. 2009-002596 filed Jan. 8, 2009, and No. 2009-007664 filed Jan. 16, 2009 in the Japan Patent Office, the disclosure of which are incorporated herein by reference.

BACKGROUND

The present invention relates to a battery pack for power tool which includes a rechargeable battery which is repeatedly rechargeable, and a power tool to which the battery pack for power tool is attached and which is operated by receiving power supply from the battery pack for power tool.

In a battery pack for power tool using a battery which includes a lithium-ion rechargeable battery (hereinafter also referred to as "a battery pack"), there is generally provided a monitoring circuit. The monitoring circuit is operated using the battery as a power source. The monitoring circuit is provided because it is necessary to always monitor a status of the battery while being charged or while discharging to the power tool which is an object to be supplied with power from the battery. Items to be monitored by the monitoring circuit includes, for example, a voltage of each battery cell composing the battery, a temperature of each battery cell (or a temperature of the entire battery), a charge/discharge current to/from the battery, and the like. A voltage of the entire battery based on a total sum of the voltage of each battery cell may also be one of the items to be monitored.

When the monitoring circuit, which is always in operation, is provided in the battery pack as above, it is inevitable that electric power of the battery is always consumed by the monitoring circuit although in a small amount. Consequently, even if the battery is not supplying electric power to the power tool, a remaining battery capacity gradually decreases to zero in a comparatively short period of time.

Meanwhile, in view of an object of the monitoring circuit, when the battery is neither being charged nor discharging to the power tool, that is, when not in use, the battery is generally in a stable state and is not necessarily required to be monitored. Therefore, a technique is conventionally known in which operations of the monitoring circuit are stopped by switching the battery pack to a sleep mode when the battery is not in use.

A timing to switch the battery pack to the sleep mode has been suggested. One example thereof is disclosed in Unexamined Japanese Patent Publication No. 2003-264008. In that publication, it is suggested that when a load is disconnected from an accumulator battery, immediately or subsequently thereafter, a supply of a load-dispatching energy to a circuit inside the accumulator battery is stopped. Another example is disclosed in Unexamined Japanese Patent Publication No. 2006-280043. In that publication, it is suggested that, once operations of a trigger switch in a power tool are released, power supply to a control unit inside a battery pack is stopped after a lapse of a predetermined period of time.

In the above-described method, while the battery is discharging (e.g., when the power tool is in use), a battery voltage is decreased and a battery temperature is increased by the discharge current and an internal resistance inside the battery. Then, when the discharge is finished, the battery voltage is increased to return to an original open voltage value, and the battery temperature drops to return close to ambient temperature, whereby the battery goes into a stable state.

Due to properties of the battery, however, the decreased battery voltage and the increased battery temperature as a result of the discharge do not recover immediately after the discharge is finished, but require a certain period of time to return to an original state. In other words, the battery gradually returns from an immediate state after the discharge and, conversely, the battery cannot be considered to be chemically stable while gradually returning to its original state. And while the battery is in such an unstable state, an abnormality may occur in the battery due to a certain cause.

Examples of such an abnormality in the battery occurring in the unstable state immediately after the discharge include a slight short circuit in battery cells composing the battery. The slight short circuit is a phenomenon in which interelectrode portion inside the battery cell is short-circuited due to a certain cause.

When the interelectrode portion inside the battery cell is short-circuited to cause the slight short circuit, the short-circuited portion is promptly fused by the short-circuit current (i.e., a momentary short circuit). The battery in which the slight short circuit has occurred appears to be normal for the moment. However, even such a momentary short circuit remains an abnormality which has occurred inside the battery cell. Therefore, it is necessary to provide a process which can detect the occurrence of the slight short circuit and make the battery unusable after the detection.

However, if the operation of the monitoring circuit is stopped by switching the battery pack to the sleep mode immediately after the discharge is finished in order to reduce electric power consumption of the battery, the abnormality such as the above slight short circuit cannot be detected. That is because the monitoring circuit is not in operation for some period of time after the discharge is finished, when the unstable state continues in which the abnormality such as the slight short circuit is highly likely to occur as described above.

Instead of switching the battery pack to the sleep mode immediately after the discharge, it is possible for the monitoring circuit to be in operation at least until the battery goes into a stable state if the battery pack is switched to the sleep mode after a predetermined period of time as described in the above patent document.

However, it is extremely difficult to accurately determine the time period required until the battery goes into a stable state after the discharge because such a time period is greatly influenced by the current and temperature during the discharge, a level of deterioration of the battery cell, and the like. Consequently, the time period cannot help but be set comparatively long, so that the monitoring circuit is steadily in operation until the battery goes into a stable state, even in a case where it takes the longest time for the battery to go into a stable state.

When the time period soon after the discharge until the battery pack is switched to the sleep mode is predetermined to a relatively long time, it is highly assumed (or rather it is often the case) that the battery goes into a stable state before the predetermined time elapses. Therefore, it is difficult to effectively reduce the electric power consumption of the battery.

Such a problem may occur in various battery packs which include a monitoring circuit for monitoring a state of a battery, as well as in the battery pack including lithium-ion rechargeable batteries.

SUMMARY

In a battery pack for power tool and a power tool operated by the battery pack according to one aspect of the present invention, it is preferable to effectively reduce electric power consumption of a battery while steadily monitoring a status of the battery soon after discharge to the power tool is finished until the battery goes into a stable state.

The battery pack according to the one aspect of the present invention includes the battery, a monitoring circuit, and a sleep mode switching unit.

The battery includes at least one battery cell.

The monitoring circuit is operated by receiving power supply from the battery.

The sleep mode switching unit switches the battery pack to a sleep mode by stopping at least a part or all of operations of the monitoring circuit when the monitoring circuit detects a discharge end state where a discharge current from the battery is equal to or lower than a predetermined set current value, and the monitoring circuit further detects at least one of a voltage stable state where a voltage change amount in the battery cell is within a predetermined stable range of voltage change amount and a temperature stable state where a temperature change amount in the battery is within a predetermined stable range of temperature change amount.

The battery pack configured as such is switched to the sleep mode not immediately when power supply from the battery (i.e., discharge from the battery) to an object to be supplied with power such as the power tool is finished and the battery pack goes into a discharge end state, but when it is detected that the battery goes into a predetermined stable state (at least one of the voltage stable state and the temperature stable state).

After the discharge is finished, therefore, monitoring by the monitoring circuit continues at least until the battery goes into the stable state, thereby enabling any abnormality such as the above-described slight short circuit in the battery cell to be accurately detected. On the other hand, when the battery is in the stable state, the sleep mode switching unit switches the battery to the sleep mode, and the monitoring circuit stops a part or all of the operations thereof.

Consequently, according to the battery pack of the present invention, the electric power consumption of the battery can be effectively reduced while steadily monitoring the status of the battery after the discharge to the power tool is finished until the battery goes into the stable state.

Here, it is preferable for the monitoring circuit to detect the voltage stable state in a case where the voltage change amounts in all of the battery cells included in the battery are within the stable range of voltage change amount. According to the battery pack configured as such, an abnormality of the battery can be detected more accurately.

Further, it is preferable for the sleep mode switching unit to switch the battery pack to the sleep mode in a case where the monitoring circuit detects the discharge end state and further detects both of the voltage stable state and the temperature stable state.

This makes it possible to perform necessary and sufficient monitoring of the battery after the discharge is finished because the battery pack is switched to the sleep mode when both of the voltage of the battery cell and the temperature of the battery become stable after the discharge is finished, that is, when the battery goes into a sufficient stable state.

Moreover, it is preferable for the sleep mode switching unit to switch the battery pack to the sleep mode when the monitoring circuit detects the discharge end state and further detects both of the voltage stable state and the temperature stable state, and also detects that a temperature of the battery is lower than a predetermined temperature threshold.

Even if the temperature change amount in the battery is within the stable range of temperature change amount, an abnormality may occur in the battery if the temperature itself is still high. Therefore, if it is detected whether or not the temperature itself as well as the temperature change amount is stable, that is, if it is detected whether or not the temperature is lower than the temperature threshold, and then the battery pack is switched to the sleep mode when the temperature is lower than the temperature threshold, the monitoring of the battery after the discharge is finished can be performed more accurately.

On the other hand, it is preferable for the monitoring circuit to determine that the battery is in an abnormal state when the monitoring circuit detects at least one of a state where the voltage change amount in the battery cell goes out of the stable range of voltage change amount and a state where the temperature change amount in the battery goes out of the stable range of temperature change amount.

When the monitoring circuit determines that the battery is in the abnormal state, various measures may be taken such as merely recording or externally notifying the occurrence of the abnormal state, or it is possible to set the battery pack itself to become unusable thereafter.

In a case where, after the battery pack is switched to the sleep mode by the sleep mode switching unit, predetermined mode returning conditions are met in the battery pack, it is preferable that a mode returning unit returns the battery pack from the sleep mode to a normal operational state.

In such a case, various mode returning conditions may be possible. For example, the mode returning unit may include a discharge start detecting unit that detects that a discharge from the battery is started. In this case, the mode returning unit may determine whether or not the start of the discharge is detected by the discharge start detecting unit. When the start of the discharge is detected, the mode returning unit may perform processing to return the battery pack from the sleep mode to the normal operational state as a processing to be performed when the mode returning condition is met. This makes it possible for the monitoring circuit to surely restart monitoring operations when the discharge is started again after the battery pack is switched to the sleep mode.

Here, it is preferable for the monitoring circuit to include at least one of a discharge current detecting unit that detects a discharge current from the battery, a cell voltage detecting unit that detects a voltage of the battery cell, and a temperature detecting unit that detects a temperature of the battery; and it is preferable that the monitoring circuit monitors the status of the battery based on a detection result obtained by each detecting unit.

Further, the battery pack may include a cell selecting switch that selectively outputs a voltage of at least one of the battery cells included in the battery; and an amplifying unit that amplifies and outputs the voltage of at least one of the battery cells selected by the cell selecting switch, and the cell voltage detecting unit may detect the voltage of the battery cell based on a signal outputted from the amplifying unit.

More specifically, the battery pack including the discharge start detecting unit as such can be configured as follows: the discharge current detecting unit includes a signal obtaining unit that obtains an electric signal corresponding to an amount of the discharge current, and a signal amplifying unit that amplifies the electric signal obtained by the signal obtaining unit with a predetermined first gain. The discharge current detecting unit is configured to continue an operation after the battery pack is switched to the sleep mode by the sleep mode switching unit. The discharge start detecting unit is configured to detect the start of the discharge based on the electric signal amplified by the signal amplifying unit. And the battery pack further includes a gain switching unit that switches a gain of the signal amplifying unit to a second gain which is greater than the first gain when the monitoring circuit detects the discharge end state.

In the battery pack configured as such, during discharge from the battery to an object to be supplied with power, the discharge current can be accurately detected because the gain of the signal amplifying unit is set to the first gain, whereas after the discharge is finished, the gain is set to the second gain which is greater than the first gain, whereby even a small amount of the discharge current is amplified to a larger value. Consequently, the discharge start detecting unit can accurately detect that the discharge is started again, even when the amount of the discharge current is small, thereby enabling the battery pack to be quickly returned from the sleep mode.

In a case where the gain switching unit is configured to switch the gain of the signal amplifying unit to the second gain when the battery pack goes into the discharge end state, it is preferable for the gain switching unit to again switch the gain to the first gain when the discharge start detecting unit detects the start of the discharge.

As just described, switching the gain to the first gain (reducing the gain) again when the discharge is started makes it possible to accurately monitor the discharge current both during and after the discharge.

The battery pack may include a battery voltage determining unit and a shutdown mode switching unit. The battery voltage determining unit can be operated in the sleep mode, and determine whether or not the voltage of the battery falls below a predetermined lower limit of a voltage threshold range. The shutdown mode switching unit may be operated in the normal operational state, and switch the battery pack to a shutdown mode when the battery voltage determining unit determines that the voltage of the battery falls below the lower limit of the voltage threshold range. In the shutdown mode, the electric power consumption of the battery is less than that in the sleep mode. When the battery voltage determining unit determines that the voltage of the battery falls below the lower limit of the voltage threshold range, the mode returning unit may perform processing to return the battery pack from the sleep mode to the normal operational state as a processing to be performed when the mode returning condition is met.

For example, when the battery pack is left unused for a long period of time after switched to the sleep mode, battery capacity gradually decreases due to natural discharge in the monitoring circuit and the battery although in an extremely small amount, and in the end there arises a possibility of overdischarging of the battery. Therefore, the battery voltage determining unit continuously monitors the battery voltage even after the battery pack is switched to the sleep mode, and the mode returning unit returns the battery pack from the sleep mode when the battery voltage falls below the lower limit of the voltage threshold range.

As just described, if the battery pack is returned from the sleep mode to the normal operational state when the battery voltage falls below the lower limit of the voltage threshold range, the shutdown mode switching unit switches the battery pack to the shutdown mode, thereby further reducing the electric power consumption of the battery and inhibiting overdischarge of the battery.

The battery pack may include a charge detecting unit that detects that a battery charger for charging the battery is connected to the battery pack. When the charge detecting unit detects that the battery charger is connected, the mode returning unit may perform processing to return the battery pack from the sleep mode to the normal operational state as a processing to be performed when the mode returning condition is met. Due to this, the battery pack is returned to the normal operational state when the battery charger is connected thereto, and the monitoring circuit is made to monitor the battery pack as per normal, whereby the battery during the charge can be accurately monitored.

By configuring the above battery pack of the present invention to be detachably attached to a tool body operated by receiving power supply from the battery pack, a power tool can be composed of the tool body and the battery pack. According to the power tool configured as such, the electric power consumption of the battery inside the battery pack is effectively reduced and, therefore, charging of the battery pack can be decreased in frequency, which enables providing a user-friendly power tool.

BRIEF DESCRIPTION OF THE DRAWINGS

The present invention will now be described in embodiments by way of example with reference to the accompanying drawings, in which:

FIGS. 5A and 5B are flowcharts showing control processes for battery monitoring performed in a battery pack.

Figure 1:
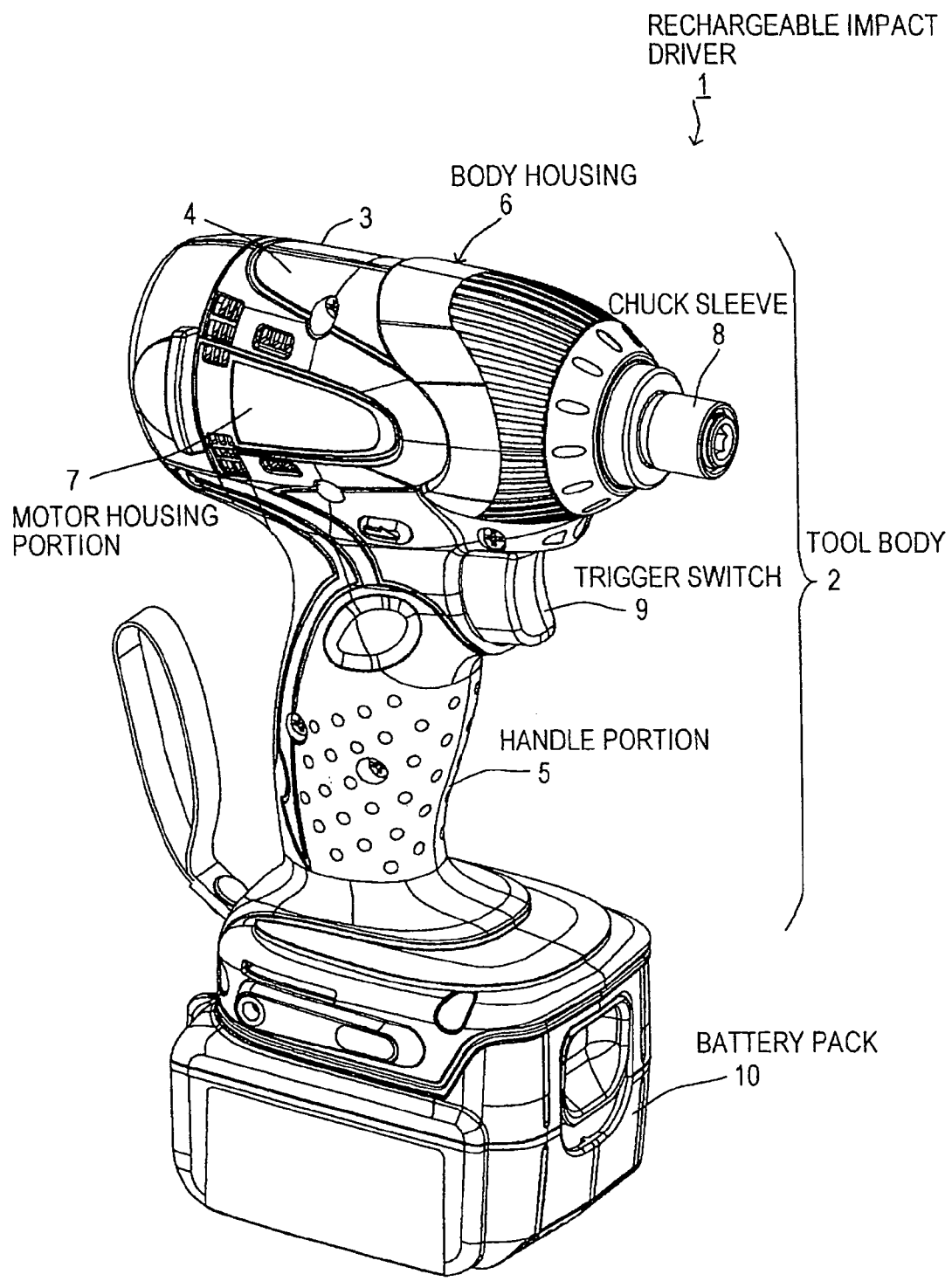
FIG. 1 is a perspective view showing an appearance of a rechargeable impact driver in an embodiment.

DETAILED DESCRIPTION OF THE PREFERRED EMBODIMENTS (1) General Structure of Rechargeable Impact Driver As shown in FIG. 1, a rechargeable impact driver 1 in the present embodiment includes a tool body 2 and a battery pack 10. The battery pack 10 is detachably attached to a lower end of the tool body 2. The tool body 2 is formed by assembling right and left half housings 3 and 4. The tool body 2 includes a body housing 6 with a handle portion 5 provided in an extending manner in a lower part thereof. The battery pack 10 is detachably attached to a lower end of the handle portion 5 of the body housing 6.

Figure 3:
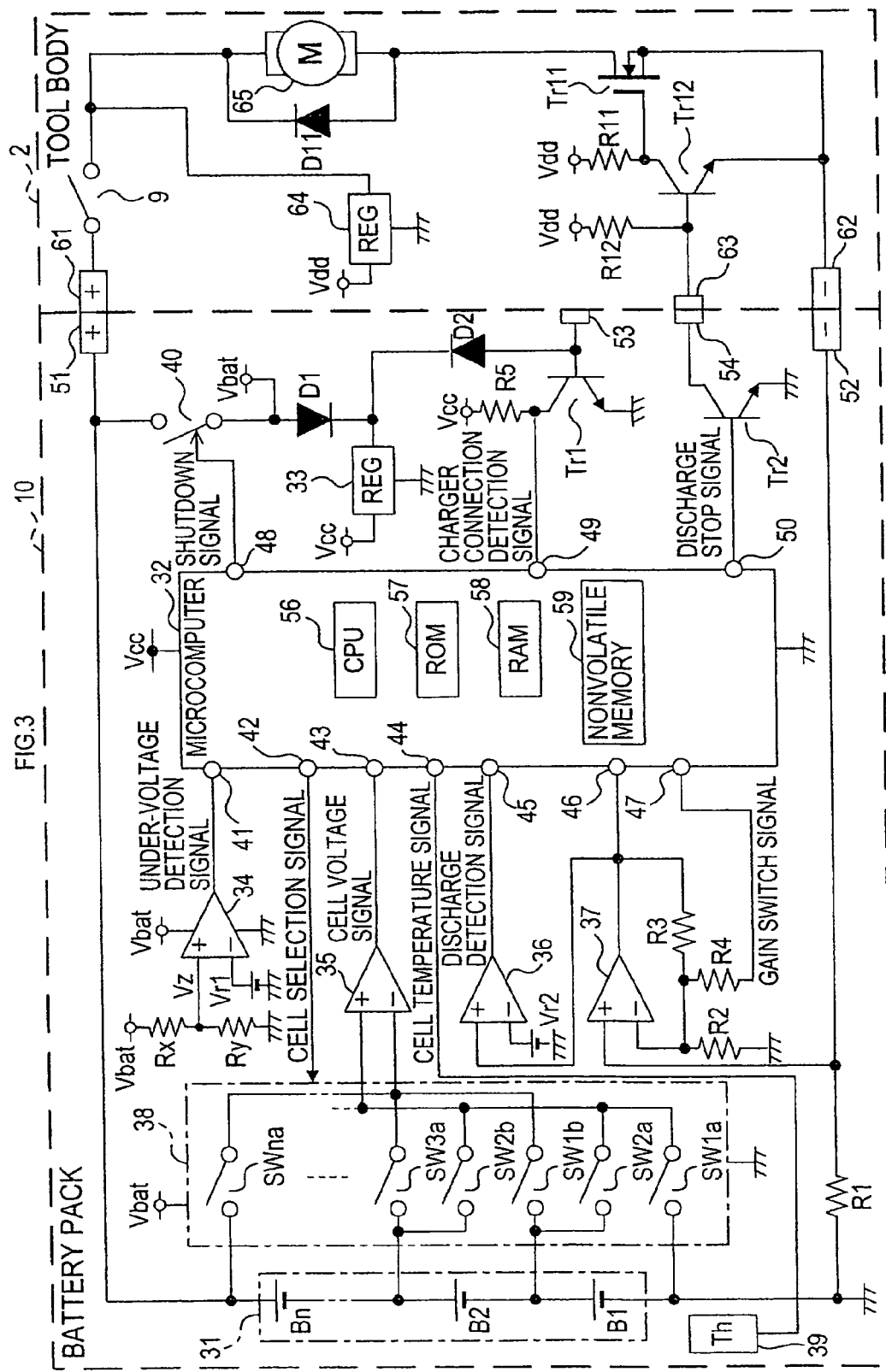
FIG. 3 is a block diagram briefly showing an electrical configuration of the rechargeable impact driver.

A motor housing portion 7 for housing a motor 65 (a direct current motor in the present embodiment as shown in FIG. 3) as a power source of the rechargeable impact driver 1 is provided at a rear (on a left side in FIG. 1) of the body housing 6. A decelerating mechanism and a percussion mechanism are housed ahead of the motor housing portion 7. A chuck sleeve 8 for attaching a tool bit (not shown) to a top end of the percussion mechanism is provided in a protruding manner at a front of the body housing 6.

The percussion mechanism includes, for example, a spindle rotated through the deceleration mechanism, a hammer rotated with the spindle and movable in an axial direction, and an anvil provided at a front of the hammer for attachment of the tool bit to a top end thereof. The percussion mechanism operates as follows:

Specifically, in the percussion mechanism, when the spindle is rotated following a rotation of the motor 65, the anvil is rotated through the hammer, causing the tool bit (e.g., a driver bit) to be rotated. Subsequently, when tightening of a screw by the tool bit proceeds and a load on the anvil is increased, the hammer retreats against a biasing force of a coil spring to depart from the anvil. Then, while rotating with the spindle, the hammer advances by the biasing force of the coil spring to again engage with the anvil to provide an intermittent percussion to the anvil, thereby performing additional tightening of the screw.

An example of such a percussion mechanism is disclosed in Japanese Unexamined Patent Publication No. 2006-0218605. A detailed explanation thereof is omitted here.

The handle portion 5 of the body housing 6 includes a trigger switch 9 operable by a user while gripping the handle portion 5. When the user operates the trigger switch 9, the motor 65 is rotated at a set rotation speed in accordance with an operation amount (a drawing amount) of the trigger switch 9 up to a predetermined maximum rotation speed.

The battery pack 10 includes a battery 31 (see FIG. 3) in which a plurality of battery cells having a predetermined voltage are connected in series. The handle portion 5 houses a drive unit that operates by receiving power supply from the battery 31 inside the battery pack 10 and rotates the motor 65 while the trigger switch 9 is being operated.

(2) General Structure of Charging System

Figure 2:
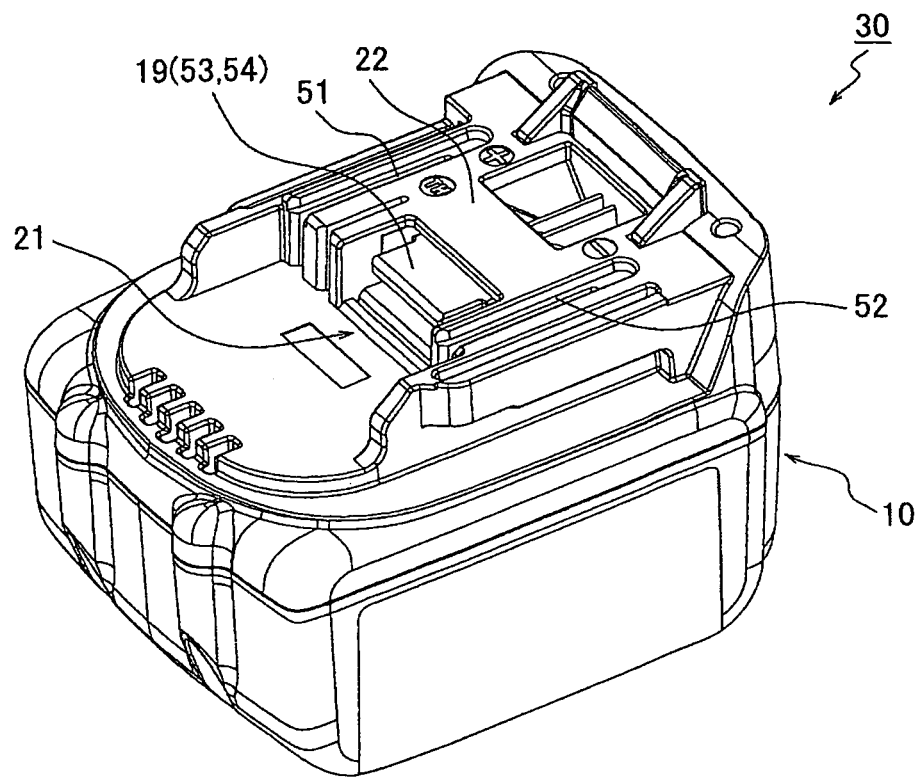
FIG. 2 is a perspective view showing a charging system in the embodiment.
Figure 2:
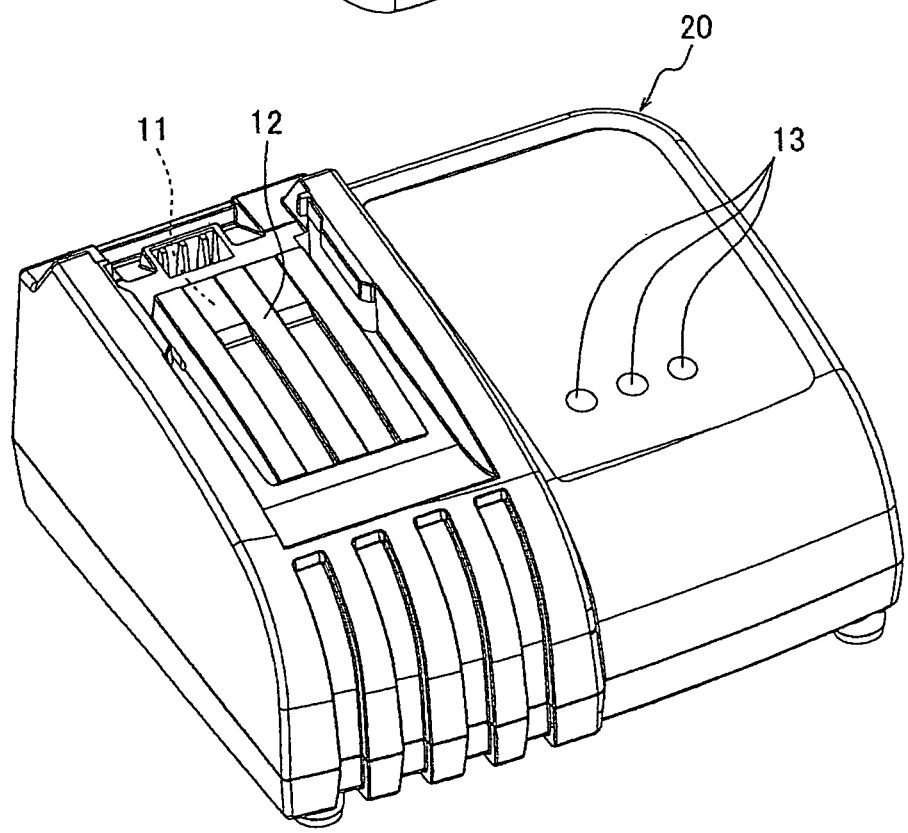

A charging system for charging the battery 31 inside the battery pack 10 will now be described with reference to FIG. 2. As shown in FIG. 2, a charging system 30 includes the battery pack 10 and a battery charger 20 for charging the battery pack 10.

The battery charger 20 generates a direct-current charging power source of a predetermined voltage for charging the battery 31 from an external input power source (not shown) such as an AC 100V power source, a DC power source from a car's cigarette lighter socket, or the like. The battery charger 20 includes a charger-side attachment portion 12 formed on one end side of an upper surface of the battery charger 20. The battery pack 10 is attached to the charger-side attachment portion 12. At a predetermined position in the charger-side attachment portion 12 (inside the charger-side attachment portion 12), a charger-side terminal 11 is further provided. The terminal 11 is configured to include one or more charger-side signal terminals. The charger-side signal terminals include a charger-side positive terminal 71, a charger-side negative terminal 72, and a charger connection signal output terminal 73 (see FIG. 4). The terminals 71 and 72 supply the battery pack 10 with the direct-current charging power source. The terminal 73 transmits/receives various signals to/from the battery pack 10. The battery charger 20 further includes a display portion 13 provided with a plurality of LEDs and the like. The display portion 13 externally indicates an operational state of the battery charger 20, a charging status of the battery pack 10, and the like.

The battery pack 10 includes a battery-side attachment portion 22 formed on one side thereof. The battery-side attachment portion 22 is attached to the charger-side attachment portion 12 of the battery charger 20 or to the lower end of the tool body 2. At a predetermined position in the battery-side attachment portion 22, a battery-side terminal 21 is further provided. The terminal 21 is electrically connected to the terminal 11 of the battery charger 20 or a tool-side terminal (not shown) of the tool body 2.

The terminal 21 is configured to include a battery-side positive terminal 51, a battery-side negative terminal 52, and a battery-side signal terminal 19. The terminals 51 and 52 are energized by charge/discharge current. The terminal 19 includes a plurality of terminals including at least a charger connection signal input terminal 53 and a discharge stop signal output terminal 54 (see FIGS. 3 and 4). The terminal 19 is electrically connected to one or more charger-side signal terminals including the terminal 73 (see FIG. 4) in the battery charger 20 or to one or more tool-side signal terminals including a discharge stop signal input terminal 63 (see FIG. 3) in the tool body 2.

When the battery-side attachment portion 22 of the battery pack 10 is attached to the charger-side attachment portion 12 of the battery charger 20, both of the terminals 11 and 21 are electrically connected to each other, thereby enabling the battery 31 inside the battery pack 10 to be charged by the battery charger 20.

When a user uses the rechargeable impact driver 1 with the battery pack 10, the battery pack 10 is attached to the lower end of the tool body 2 in the same manner as in the case where the battery pack 10 is attached to the battery charger 20. Thus, the terminals 51 and 52 in the battery pack 10 are electrically connected respectively to a tool-side positive terminal 61 (see FIG. 3) and a tool-side negative terminal 62 (see FIG. 3) in the tool body 2. This allows the tool body 2 to be supplied with power from the battery pack 10.

(3) Electrical Configuration of Rechargeable Impact Driver

An electrical configuration of the rechargeable impact driver 1 will now be described with reference to FIG. 3. FIG. 3 shows a state in which the battery pack 10 is attached to the tool body 2. In FIG. 3, the battery pack 10 and the tool body 2 are connected to each other electrically as well.

Firstly, an electrical configuration of the battery pack 10 to be attached to the tool body 2 will be described. The battery pack 10 incorporates therein a variety of different circuits such as various circuits for controlling a discharge (power supply) to the tool body 2 and a charge by the battery charger 20, various circuits for monitoring a status of the battery 31, and the like. Among the above circuits, FIG. 3 exclusively shows the circuits related to a monitoring of a status of the battery 31, and omits the circuits unrelated to the monitoring.

In other words, the circuits inside the battery pack 10 shown in FIG. 3 include a microcomputer 32 as a main component, and can be regarded as a monitoring circuit for monitoring the status of the battery 31 as a whole. Accordingly, a detailed description concerning control processes during discharge to the tool body 2 and during charge by the battery charger 20 is omitted in the following description. A configuration and operation of the monitoring circuit shown in FIG. 3 will now be described in detail.

As shown in FIG. 3, the battery pack 10 of the present embodiment includes the battery 31, the microcomputer 32, a battery-side regulator 33, and the terminals 51, 52, 53, and 54. The microcomputer 32 collectively carries various controlling functions in the battery pack 10, e.g., a control of charge/discharge of the battery 31 and a monitoring of the status of the battery 31. The regulator 33 generates a battery-side control power source (a direct current power source having a voltage Vcc) using electric power of the battery 31 as input for operating the various circuits inside the battery pack 10. The terminal 51 is connected to a positive side of the battery 31. The terminal 52 is connected to a negative side of the battery 31. The terminals 53 and 54 constitute the terminal 19 (see FIG. 2).

The battery 31 is configured by connecting a plurality of battery cells B1, B2, ..., and Bn in series. In the present embodiment, respective battery cells B1, B2, ..., and Bn each can be lithium-ion rechargeable batteries having a normal voltage of 3.6V, and ten lithium-ion rechargeable batteries can be connected in series. Therefore, in this example, a total voltage of the battery 31 (hereinafter referred to as "battery voltage") Vbat is approximately 36V in a normal state.

The electric power of the battery 31 is supplied to the tool body 2 through the terminals 51 and 52. When the battery 31 is charged by the battery charger 20, the direct current charging power source is supplied to the battery 31 from the battery charger 20 through the terminals 51 and 52 as will be described later.

The battery voltage Vbat is inputted to the regulator 33 through a shutdown switch 40 and a diode D1. The shutdown switch 40 is turned on/off in accordance with a shutdown signal from the microcomputer 32. Details of the on/off control will be described later. Since the shutdown switch 40 is generally turned on as long as the battery 31 is in a normal state, the battery voltage Vbat is generally inputted to the regulator 33 through the shutdown switch 40 and the diode D1. The regulator 33 generates the power source Vcc based on the inputted battery voltage Vbat.

In the battery pack 10, as shown in FIG. 3, a circuit operated with the power source Vcc and a circuit operated with the battery voltage Vbat are present in a mixed manner. The battery voltage Vbat inputted through the shutdown switch 40 is inputted to an anode of the diode D1. The battery voltage Vbat is also inputted to each circuit inside the battery pack 10, which is to be operated with the battery voltage Vbat.

The battery pack 10 further includes a cell selecting switch 38, a differential amplifying circuit 35, a temperature detecting circuit 39, an under-voltage detecting comparator 34, a current detecting resistor R1, a non-inverting amplifying circuit, a discharge detecting comparator 36, a charger detecting transistor Tr1, and a discharge stop signal outputting transistor Tr2. The switch 38 selectively outputs one of voltages (hereinafter referred to as "cell voltage") of the battery cells B1, B2, . . . , Bn in the battery 31. The circuit 36 amplifies a voltage of the one of the battery cells selected by the cell selecting switch 38 and outputs the amplified voltage as a cell voltage signal. The circuit 39 is provided in the vicinity of the battery 31. The circuit 39 detects a temperature of a battery cell (hereinafter referred to as "cell temperature") and outputs the temperature as a cell temperature signal. The comparator 34 compares a divided battery voltage value Vz obtained by dividing the battery voltage Vbat by voltage divider resistors Rx and Ry with a predetermined first reference voltage Vr1, and outputs the comparison result as an under-voltage detection signal. The resistor R1 is used to detect a discharge current at the time of discharge from the battery 31 to the tool body 2. The non-inverting amplifying circuit comprises an operational amplifier 37 and resistors R2, R3, and R4, and is used to generate a discharge current signal by amplifying the current detected by the resistor R1 (i.e., a voltage signal corresponding to a current value) with a predetermined gain. The comparator 36 compares the discharge current signal amplified by the non-inverting amplifying circuit with a predetermined second reference voltage Vr2. Then the comparator 36 outputs the comparison result as a discharge detection signal. The transistor Tr1 is used to detect that the battery charger 20 is connected. The Tr2 is used to output a discharge stop signal (to be detailed below) outputted from the microcomputer 32 to the tool body 2.

As the transistors Tr1 and Tr2, an NPN-type bipolar transistor is used in the present embodiment by way of example only. The same applies to a case of a discharge stopping transistor Tr12 inside the tool body 2, which is to be described later.

The cell selecting switch 38 is operated with the battery voltage Vbat. The switch 38 is configured so that, in accordance with a cell selection signal from the microcomputer 32, a voltage in one of the battery cells indicated by the cell selection signal is outputted and then inputted to the circuit 35. As illustrated, the cell selecting switch 38 includes a plurality of switches SW1a, SW2a, SW1b, SW2b, SW3a, . . . , SWna.

The switch SW1a is connected between a negative electrode of the battery cell B1 and a non-inverting input terminal of the circuit 35. The switch SW1b is connected between a positive electrode of the battery cell B1 and an inverting input terminal of the circuit 35. In the cell selecting switch 38 configured as above, in a case, for example, where the battery cell B1 with the lowest potential is selected by the cell selection signal, the switches SW1a and SW1b are turned on, and the other switches are all turned off. As a result, a voltage of the selected battery cell B1 is inputted from the cell selecting switch 38 to the circuit 35.

The switch SW2a is connected between a negative electrode of the battery cell B2 and the non-inverting input terminal of the circuit 35. The switch SW2b is connected between a positive electrode of the battery cell B2 and the non-inverting input terminal of the circuit 35. In another case, for example, where the battery cell B2 connected to the positive electrode of the battery cell B1 is selected by the cell selection signal, the switches SW2a and SW2b are turned on, and the other switches are all turned off in the cell selecting switch 38. As a result, a voltage of the selected battery cell B2 is inputted from the cell selecting switch 38 to the circuit 35.

The circuit 35 is operated with the power source Vcc. The voltage inputted from the cell selecting switch 38 (i.e., a potential difference of the selected any one of the battery cells) is amplified by the circuit 35 and inputted to the microcomputer 32 as a cell voltage signal.

The circuit 39 is configured as a known temperature sensor including a thermo-sensitive device such as a thermistor. The thermo-sensitive device is provided in the vicinity of each battery cell in the battery 31. Various configurations can be used as to where the thermo-sensitive device is to be provided or how many thermo-sensitive devices are to be provided. For example, one thermo-sensitive device may be provided and a detection result based on the device may be regarded as a cell temperature of each battery cell. Alternatively, thermo-sensitive devices may be separately provided for each of the battery cells, and a cell temperature may be individually detected with respect to each battery cell. In the present embodiment, explanation is given based on the former (the case where one thermo-sensitive device is provided) to simplify the description.

The comparator 34 is operated with the battery voltage Vbat (or the power source Vcc). The comparator 34 outputs the under-voltage detection signal of high (H) level to the microcomputer 32 in a normal state where the divided battery voltage value Vz is equal to or greater than the first reference voltage Vr1. On the other hand, in a case where the battery voltage Vbat is decreased, and the voltage value Vz thereby falls below the voltage Vr1, the comparator 34 outputs the under-voltage detection signal of low (L) level to the microcomputer 32. The comparator 34 is intended to inhibit overdischarge of the battery 31, and detects when the battery 31 is almost in an overdischarge state. Accordingly, the voltage Vr1 is appropriately set to a value which makes it possible to detect when the battery 31 is almost in the overdischarge state. In the present embodiment, by way of example, in order to detect when the battery voltage Vbat falls below 25V, the voltage Vr1 is set to a value obtained by dividing 25V by the resistors Rx and Ry.

The resistor R1 is provided on a current-carrying path extending from the terminal 52 to a negative electrode of the battery 31 (a negative electrode of the battery cell B1 with the lowest potential). A voltage drop (a voltage signal) caused by a discharge current at the resistor R1 is inputted to the operational amplifier which constitutes the non-inverting amplifying circuit.

The non-inverting amplifying circuit basically includes the operational amplifier 37 which is operated with the power source Vcc, and has a known configuration. The voltage signal detected by the resistor R1 is inputted to the non-inverting input terminal. The inverting input terminal is connected to a ground line (a ground potential) through the resistor R2. The inverting input terminal is also connected to an output terminal through the resistor R3. In the present embodiment, which has the above configuration as a basis, the resistor R4 is further connected between the inverting input terminal and the microcomputer 32. The gain of the non-inverting amplifying circuit can be switched between two levels with this configuration.

One end of the resistor R4 is connected to the inverting input terminal of the operational amplifier 37, and the other end is connected to a gain switch signal output port 47 of the microcomputer 32. The microcomputer 32 achieves gain switching of the non-inverting amplifying circuit by switching the port 47 between a high impedance and an L-level output.

In other words, in a normal state where a high impedance signal is outputted as a gain switch signal, the resistor R4 is equivalent to being electrically nonexistent when seen from the non-inverting amplifying circuit. Therefore, the gain of the non-inverting amplifying circuit in such a case is 1+(R3/R2), which is hereinafter referred to as a first gain. The first gain is set so as to appropriately detect a comparatively large amount of discharge current (e.g., a heavy current of several tens of amperes) in a steady state where the tool body 2 is operated by receiving power supply from the battery 31.

On the other hand, when the discharge current drops to 0 A as described later, the microcomputer 32 switches the gain of the non-inverting amplifying circuit to a second gain which is greater than the first gain by outputting an L-level signal as a gain switch signal. More specifically, in a case where the gain switch signal is the L-level signal and the other end (the side of the microcomputer 32) of the resistor R4 is connected to a ground potential, the gain (the second gain) of the non-inverting amplifying circuit is 1+{R3/(R2//R4)}. Here, (R2//R4) represents a parallel combined resistance of the resistor R2 and the resistor R4. In short, the second gain becomes greater than the first gain.

The comparator 36 is operated with the power source Vcc. The comparator 36 outputs the discharge detection signal of H level to the microcomputer 32 in a case where the discharge current signal outputted from the operational amplifier 37 is equal to or greater than the second reference voltage Vr2. On the other hand, in a case where the discharge current signal outputted from the operational amplifier 37 is smaller than the voltage Vr2, the comparator 36 outputs the discharge detection signal of L level to the microcomputer 32. The comparator 36 is intended to detect when power supply from the battery 31 to the tool body 2 is started by an operation of a trigger switch 9 of the tool body 2.

When the power supply to the tool body 2 is started, the discharge current is increased immediately due to properties of a load (the motor 65 here), and is brought into a steady state before long. Therefore, the voltage Vr2, which is a criterion for detecting discharge, may be set to various values. For example, a voltage corresponding to a current value close to a current value in the steady state (e.g., several tens of amperes) or a voltage corresponding to a current value approximately one half of the current value in the steady state. In the present embodiment, however, the voltage Vr2 is set to a lower value (e.g., a voltage corresponding to 1 A) so that the discharge can be detected quickly without a need to wait for the steady state to be attained after the discharge is started.

The discharge current signal inputted to the comparator 36 is inputted from the non-inverting amplifying circuit including the operational amplifier 37. The discharge current signal varies in level depending on the gain of the non-inverting amplifying circuit as described above. In such a configuration, on a condition that the gain of the non-inverting amplifying circuit remains fixed to the first gain, by which a heavy current can be appropriately detected, it would be difficult to accurately detect a small amount of discharge current (e.g., several amperes), for example during low-speed running of the motor.

In the present embodiment, therefore, the microcomputer 32 switches the gain of the non-inverting amplifying circuit to the second gain when the discharge is finished. Even a small amount of the discharge current can be thereby detected. That is, the gain is set high enough for a small current to be adequately detected. And then, when the start of the discharge is detected, the gain is again switched to the first gain, whereby a heavy current can be adequately detected.

A purpose of allowing the gain of the non-inverting amplifying circuit to be switchable as such is basically to make it possible to accurately detect even a small amount of current as described above. A further purpose is to facilitate a quick recovery (wake-up) of the monitoring circuit including the microcomputer 32 from a sleep mode to a normal operational state when the discharge is restarted after the monitoring circuit enters the sleep mode as described later. Switching to the second gain at the end of the discharge makes it possible to accurately detect when the discharge is restarted, even when the current value is small, for example during low-speed running of the motor, and to wake up the monitoring circuit more quickly.

In the transistor Tr1, a base is connected to the terminal 53, an emitter is connected to a ground potential, and a collector is connected to the power source Vcc through a resistor R5. The collector is also connected to a charger connection detection signal input port 49 of the microcomputer 32. Operations of the transistor Tr1 will be later described with reference to FIG. 4.

In the transistor Tr2, a base is connected to a discharge stop signal output port 50 of the microcomputer 32, an emitter is connected to a ground potential, and a collector is connected to the terminal 54.

The microcomputer 32 has a known configuration including therein a CPU 56, a ROM 57, a RAM 58, a nonvolatile memory 59, and the like as hardware. The microcomputer 32 is operated with the power source Vcc generated by the regulator 33. The microcomputer 32 performs various controls in accordance with various programs stored in the ROM 57.

The microcomputer 32 includes following ports to/from which signals are inputted/outputted: an under-voltage detection signal input port 41, a cell selection signal output port 42, a cell voltage signal input port 43, a cell temperature signal input port 44, a discharge detection signal input port 45, a discharge current signal input port 46, the gain switch signal output port 47, a shutdown signal output port 48, the charger connection detection signal input port 49, the discharge stop signal output port 50, and the like. The under-voltage detection signal from the comparator 34 is inputted to the port 41. The cell selection signal to the cell selecting switch 38 is outputted from the port 42. The cell voltage signal from the circuit 35 is inputted to the port 43. The cell temperature signal from the circuit 39 is inputted to the port 44. The discharge detection signal from the comparator 36 is inputted to the port 45. The discharge current signal from the operational amplifier 37 is inputted to the port 46. The gain switch signal is outputted from the port 47. The shutdown signal controlling the shutdown switch 40 is outputted from the port 48. A charger connection detection signal from the transistor Tr1 is inputted to the port 49. The discharge stop signal to the transistor Tr2 is outputted from the port 50.

An electrical configuration of the tool body 2 in the rechargeable impact driver 1 will now be described. As shown in FIG. 3, the tool body 2 includes the terminals 61, 62, and 63, the trigger switch 9, a tool-side regulator 64, the motor 65, an energization controlling transistor Tr11, and the transistor Tr12. The terminal 61 is electrically connected to the terminal 51 of the battery pack 10. The terminal 62 is electrically connected to the terminal 52. The terminal 63 is electrically connected to the terminal 54 of the battery pack 10. The regulator 64 generates a tool-side control power source (a direct current power source of a voltage Vdd) for operating respective portions inside the tool body 2 based on the battery voltage Vbat inputted from the battery pack 10 when the trigger switch 9 is operated (turned on). The motor 65 is connected between the terminals 61 and 62. The transistor Tr11 is connected in series with the motor 65. The transistor Tr12 stops operation of the motor 65 (i.e., stops discharge from the battery 31 to the tool body 2) by turning off the transistor Tr11 when the discharge stop signal from the battery pack 10 is inputted to the terminal 63.

As the transistor Tr11, a MOSFET can be used in the present embodiment. Both ends of the motor 65 are connected to a diode D11 used as a free-wheel diode for releasing residual energy of the motor 65 when the trigger switch 9 is switched to an "off" position.

In the tool body 2 configured as such, when the trigger switch 9 is operated, power supply is started from the battery 31 to the side of the tool body 2. The power source Vdd is thereby generated at the regulator 64 and supplied to each portion inside the tool body 2. As a result, the power source Vdd is applied to a base of the transistor Tr12 through a resistor R12. The power source Vdd is also applied to a collector of the transistor Tr12 through a resistor R11.

In the battery pack 10, in a case where no abnormality is detected in the battery 31 and a discharge to the tool body 2 can be allowed, the microcomputer 32 outputs the discharge stop signal of H level (i.e., a signal to allow the discharge) from the port 50. And the terminal 54 is made to be L level (a ground potential).

Consequently, in the tool body 2, the base of the transistor Tr12 is also turned out to be a ground potential, whereby the transistor Tr12 is turned off. The power source Vdd is thereby applied to a gate of the transistor Tr11, which is turned on to allow the motor 65 to be energized.

(4) Electrical Configuration of Charging System

An electrical configuration of the charging system 30 as shown in FIG. 2 for charging the battery 31 in the battery pack 10 will now be described with reference to FIG. 4.

Figure 4:
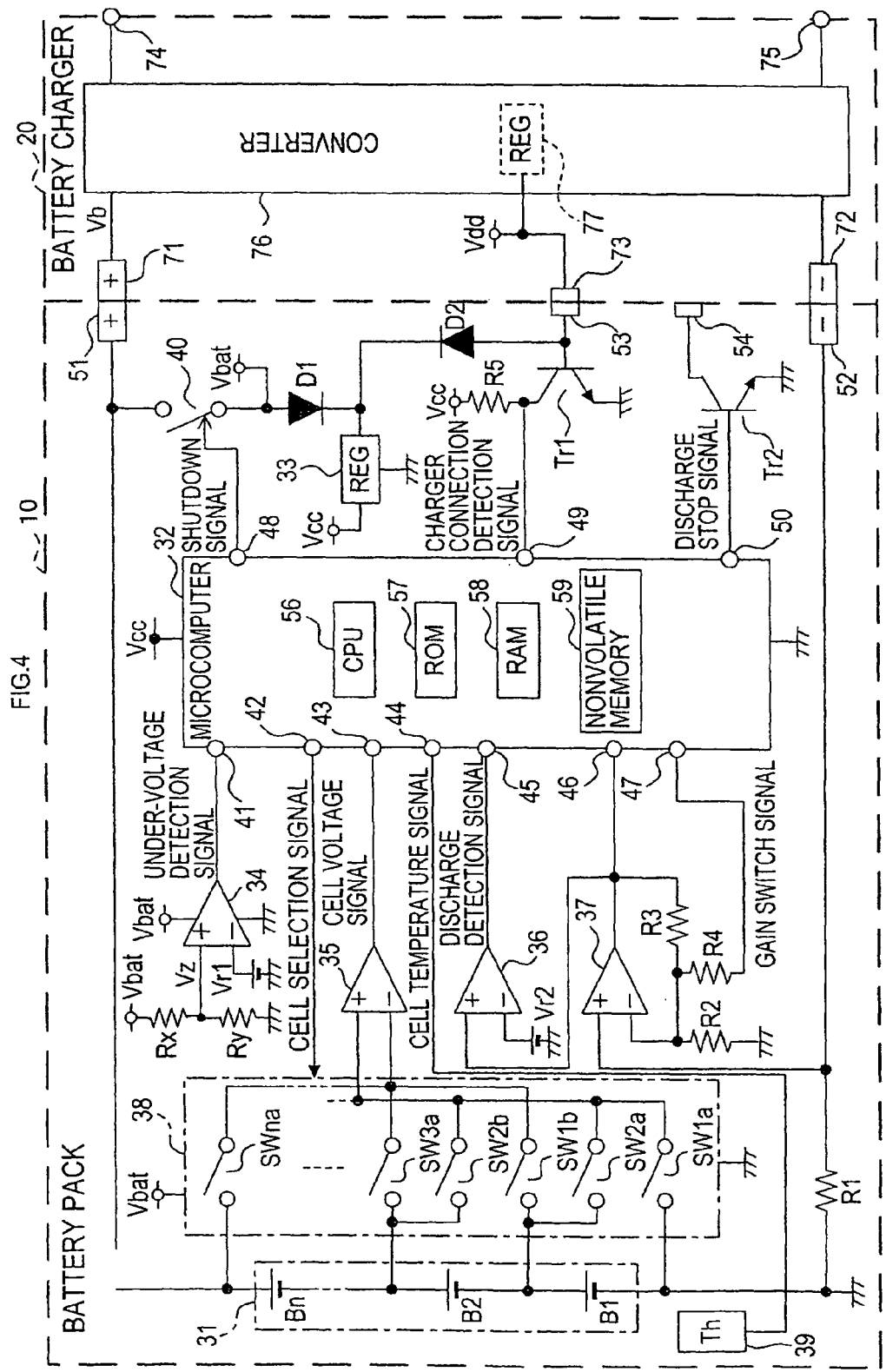
FIG. 4 is a block diagram briefly showing an electrical configuration of the charging system.

As shown in FIG. 4, when charging the battery 31, the battery pack 10 is attached to the battery charger 20. The battery charger 20 includes the terminals 71, 72, and 73, and a converter 76. The terminal 71 is electrically connected to the terminal 51 of the battery pack 10. The terminal 72 is electrically connected to the terminal 52. The terminal 73 is electrically connected to the terminal 53 of the battery pack 10. The converter 76 generates the direct-current charging power source from an external input power source inputted through two input power source terminals 74 and 75.

Though not shown, the battery charger 20 further includes a control circuit performing various controls such as a control of generation of the direct-current charging power source by the converter 76. The converter 76 includes a charger-side regulator 77 which generates the charger-side control power source (a direct current power source of a voltage Vdd), with which various portions inside the battery charger 20 including the above control circuit are operated.

The charger-side control power source Vdd is also inputted to the battery pack 10 as a charger connection signal from the terminal 73. In the battery pack 10, the charger connection signal is inputted to the base of the transistor Tr1 through the terminal 53. The transistor Tr1 is thereby turned on, and a potential of the collector thereof, i.e., the signal to be inputted to the microcomputer 32, becomes L level.

When the battery charger 20 is not connected to the battery pack 10, the signal inputted to the port 49 of the microcomputer 32 becomes H level due to the power source Vcc inputted through the resistor R5. On the other hand, when the battery charger 20 is connected to the battery pack 10, the transistor Tr1 is turned on as above due to the charger connection signal (voltage Vdd) from the battery charger 20, whereby the signal to the port 49 of the microcomputer 32 becomes L level. Therefore, the microcomputer 32 can determine whether or not the battery charger 20 is connected (specifically, whether or not the battery 31 is being charged) based on a level of the signal inputted through the port 49.

Furthermore, the charger connection signal (voltage Vdd) inputted from the battery charger 20 to the battery pack 10 is also inputted to the regulator 33 through a diode D2. The regulator 33 generates the power source Vcc basically from the battery voltage Vbat. However, in a case where the charger connection signal (i.e., the power source Vdd) is inputted from the battery charger 20 under a condition that the battery voltage Vbat is not being inputted due to the off-state of the shutdown switch 40, the power source Vcc is generated from the power source Vdd inputted from the battery charger 20.

(5) Control Processes for Battery Monitoring in Battery Pack

In the battery pack 10 configured as such, the microcomputer 32 always monitors the battery 31 based on the cell temperature, the cell voltage of each battery cell, the electric current at the time of charge and discharge of the battery 31, and the like, while operating normally (in a normal operational state), except while in a sleep mode and a shutdown mode, which will be described later. Explanation on a configuration for monitoring a charge current at the time of charging is omitted in the present embodiment. Items to be monitored by the microcomputer 32 as to the battery 31 are not limited to the above cell voltage, cell temperature, and charge/discharge current, and other items may be monitored.

In a normal operational state, the battery 31 is variously monitored by the operation of each portion constituting the monitoring circuit inside the battery pack 10 shown in FIG. 3.

On the other hand, if given conditions for switching the microcomputer 32 to a sleep mode are met, as in such a case where the tool body 2 is not receiving power supply, the microcomputer 32 switches the entire monitoring circuit (including itself) to a sleep mode. Electric power consumption of the battery 31 is thereby reduced compared to that during the normal operational state. In the sleep mode, however, power supply to each portion, including the microcomputer 32, inside the battery pack 10 is not completely stopped. Minimum necessary operations are continuously performed to return from the sleep mode and wake up.

Specifically, after switched to a sleep mode, the microcomputer 32 determines at least whether or not discharge is started based on a signal from the comparator 36; whether or not the battery charger 20 is connected based on the signal from the transistor Tr1; and whether or not the voltage value Vz falls below the voltage Vr1 (i.e., in the present example, whether or not the battery voltage Vbat falls below 25V) based on the signal from the comparator 34.

Owing to this, if any of returning conditions, that is, a condition where discharge from the battery 31 is started, a condition where the battery charger 20 is connected, and a condition where the voltage value Vz falls below the voltage Vr1, are met after switched to a sleep mode, the microcomputer 32 is again returned from the sleep mode to a normal operational state. When returned due to start of discharge, the microcomputer 32 controls the discharge (power supply to the tool body 2) while monitoring a status of the battery 31, as will be described later. When returned due to connection of the battery charger 20, the microcomputer 32 enters a charge monitoring mode, and performs various controls related to charging, monitoring of the status of the battery 31 while charging, and the like. When returned due to decrease in the battery voltage, the microcomputer 32 is switched to the shutdown mode, in which electric power consumption of the battery 31 is still less than that in the sleep mode.

Specifically, switch to the shutdown mode is performed by turning off the shutdown switch 40 in accordance with the shutdown signal. Therefore, in the shutdown mode, the battery voltage Vbat is not supplied at all to the entire monitoring circuit including the regulator 33 in the battery pack 10, whereby operations of the entire monitoring circuit including the microcomputer 32 are completely stopped.

The microcomputer 32 may be so configured as to continue the operations required for wake-up as described above even if the voltage value Vz falls below the voltage Vr1. In such a case, although electric power consumption is sufficiently lower than that in the normal operational state, the battery voltage is consumed slowly but steadily, whereby discharge of the battery 31 further proceeds and the battery 31 may be brought into an overdischarge state. In the present embodiment, therefore, when the voltage value Vz falls below the voltage Vr1, it is prioritized to inhibit overdischarge of the battery 31 over functions of the monitoring circuit. That is, the shutdown switch 40 is turned off, and the power supply from the battery 31 to each portion inside the battery pack 10 is thereby completely blocked.

Figure 5A:
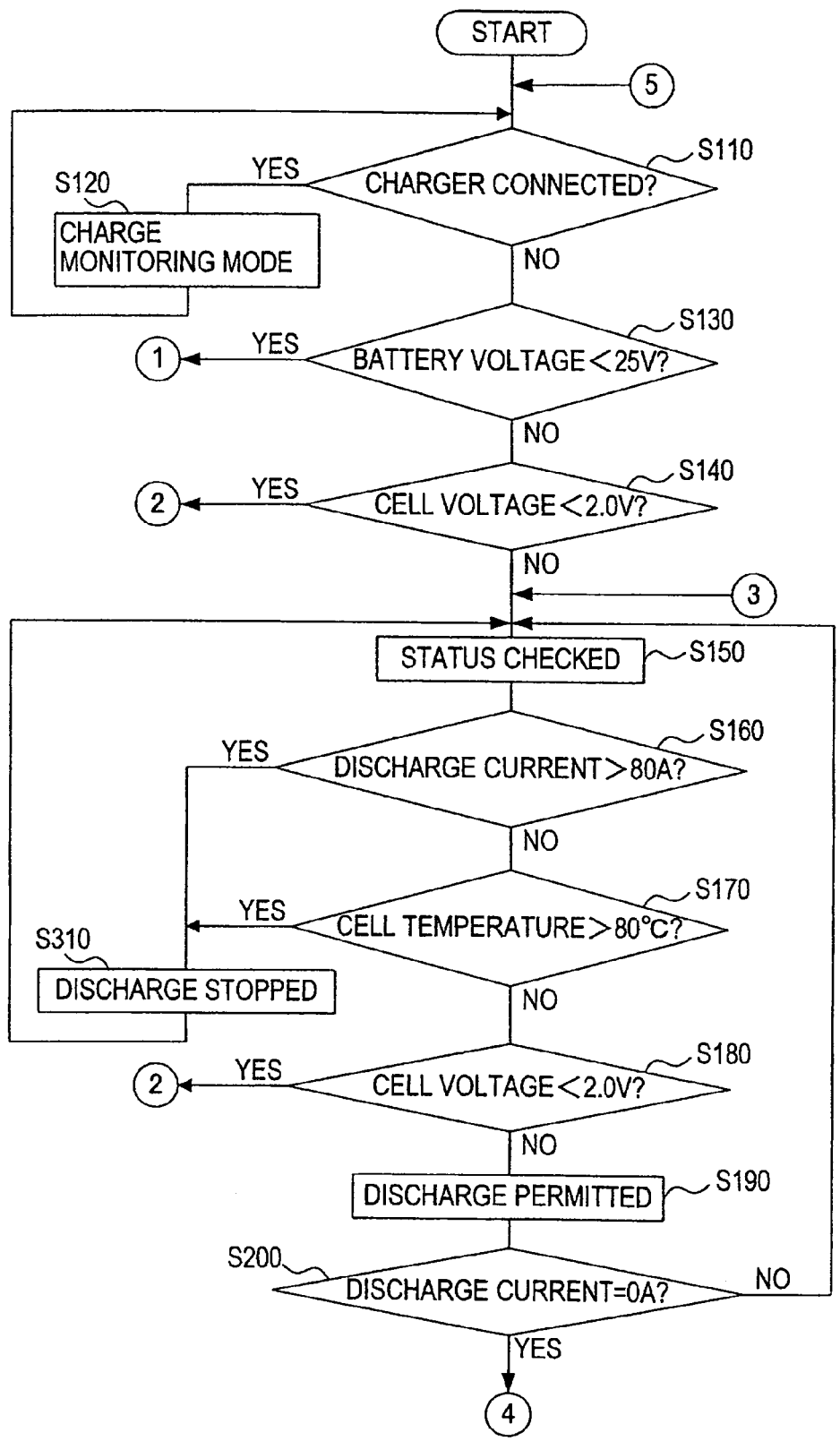

Hereinafter, explanation is given with reference to FIGS. 5A and 5B on control processes for battery monitoring, which are performed by the microcomputer 32, in the battery pack 10 of the present embodiment configured as above. In the microcomputer 32 inside the battery pack 10, the CPU 56 reads out a control process program from the ROM 57, and executes the processes in accordance with the program.

When the control processes for battery monitoring are started, it is initially determined whether or not the battery charger 20 is connected (S110) based on the signal inputted to the port 49 of the microcomputer 32. When the signal inputted to the port 49 is H level, the battery charger 20 is determined not to be connected, whereas when the signal inputted to the port 49 is L level, the battery charger 20 is determined to be connected.

When the battery charger 20 is determined to be connected (S110: YES), the monitoring circuit including the microcomputer 32 inside the battery pack 10 enters a charge monitoring mode (S120). In the charge monitoring mode, the microcomputer 32 sets a charge monitoring mode flag in the RAM 58. The microcomputer 32 also controls charging to the battery 31 while monitoring the status of the battery 31.

On the other hand, when the battery charger 20 is determined not to be connected (S110: NO), it is determined whether or not the battery voltage Vbat is lower than 25V (S130) based on the signal from the comparator 34. When the battery voltage Vbat is determined to be lower than 25V (S130: YES), the monitoring circuit is switched to a shutdown mode (S370) after data storage is performed because the battery 31 may be brought into an overcharging state. That is, the power supply from the battery 31 to the battery pack 10 is completely stopped by turning off the shutdown switch 40.

The above data storage refers to storing various data into the nonvolatile memory 59 from the microcomputer 32 (for example, in the RAM 58 and the like) in which the various data has been held. The various data can include, for example, various histories such as the number of charging, the highest and the lowest values of the cell temperature, the largest and the smallest values of the discharge current.

After entering the shutdown mode as above, the shutdown mode is maintained unless the battery charger 20 is connected and charging is thereby started. When the battery charger 20 is connected, the power source Vdd inside the battery charger 20 is inputted to the regulator 33 through the diode D2. The regulator 33 thereby starts to generate the power source Vcc from the power source Vdd. The generated power source Vcc is inputted to the microcomputer 32, which thereby starts to perform various controls (normal operations) including the control processes for battery monitoring.

When the battery voltage Vbat is determined to be 25V or higher (S130: NO) in the determination process in S130, each of the battery cells B1, B2, . . . , and Bn is determined whether or not to have a cell voltage of lower than 2.0V (S140). When the cell voltages of all the battery cells are 2.0V or higher (S140: NO), a status check is performed (S150). On the other hand, when any one of the battery cells has a cell voltage of lower than 2.0V (S140: YES), the monitoring circuit enters a no-discharge mode (S320).

Specifically, the microcomputer 32 sets a no-discharge mode flag in the RAM 58 inside the microcomputer 32, as well as outputs the signal of L level from the port 50. As a result, the transistor Tr12 is turned on and the transistor Tr11 is turned off in the tool body 2, whereby energization to the motor 65 (i.e., discharge from the battery 31) is stopped.

In the status check in S150, various data are obtained showing the status of the battery 31 such as the battery voltage Vbat, the cell voltage, the cell temperature, the discharge current, and the like.

Then, it is determined whether or not the discharge current is greater than 80 A (S160) based on the signal inputted to the port 46. When the discharge current is greater than 80 A (S160: YES), the monitoring circuit enters a discharge stop mode (S310). In the discharge stop mode, specifically, the microcomputer 32 sets a discharge stop mode flag in the RAM 58 inside the microcomputer 32, as well as outputs the discharge stop signal of L level from the port 50 as in the no-discharge mode in S320. The discharge from the battery 31 to the tool body 2 is thereby stopped, and the process again returns to the status check in S150.

When the discharge current is 80 A or less (S160: NO), it is determined whether or not the cell temperature is higher than 80° C. (S170) based on the signal inputted to the port 44. When the cell temperature is higher than 80° C. (S170: YES), the monitoring circuit enters the discharge stop mode (S310) and the process again returns to the status check in S150. On the other hand, when the cell temperature is 80° C. or lower (S170: NO), it is determined again whether or not the cell voltage is lower than 2.0V (S180) in the same manner as in S140. When any one of the voltage cells has a cell voltage of lower than 2.0V (S180: YES), the monitoring circuit enters a no-discharge mode (S320), whereas when all the battery cells are 2.0V or higher (S180: NO), the monitoring circuit enters a discharge permissive mode (S190). Specifically, the microcomputer 32 sets a discharge permissive mode flag in the RAM 58.

In the present embodiment, under the condition where the discharge current is 80 A or less, the cell voltages of all the battery cells are 2.0V or higher, and the cell temperature is 80° C. or lower when discharge is performed, discharge permissive conditions are determined to be met. As a result, the power supply to the tool body 2 continues, thereby allowing the tool body 2 to be operated continuously.

After entering the discharge permissive mode, the battery 31 continues to be monitored as well. Specifically, after switched to the discharge permissive mode in S190, it is initially determined whether or not the discharge current becomes 0 A (S200). During discharge, i.e., while the tool is in use, the discharge is continuing (S200: NO) and the process again returns to the status check in S150. On the other hand, when the discharge from the battery 31 to the tool body 2 is terminated by releasing an operation of the trigger switch 9, the discharge current becomes 0 A (S200: YES). In such a case, the microcomputer 32 outputs the signal of L level from the port 47, thereby switching the gain of the non-inverting amplifying circuit, which includes the operational amplifier 37 and others, from the first gain in an initial state to the second gain which is greater than the first gain (S210).

This makes it possible, when the discharge is restarted next time, to quickly detect the restart of the discharge even when the current value is still small, for example during low-speed running of the motor. In determining whether or not the discharge current is 0 A in S200, the discharge current from the battery 31 does not have to be entirely 0 A, but 0 A here means a state where the discharge of the battery 31 accompanying the power supply to the tool body 2 is finished (i.e., a state where the power supply to the tool body 2 becomes 0 A). In practice, therefore, a prescribed current value for determining the termination of discharge may be set based on electric power consumed in each circuit including the microcomputer 32 inside the battery pack 10. When the discharge current is less than the prescribed current value, the battery 31 may be determined to be finished with the discharge. The process proceeds to S210 after the process of S200.

After the gain of the non-inverting amplifying circuit is switched to the second gain in S210, which enables even relatively small discharge current to be accurately detected, it is determined again whether or not the discharge current is greater than 0 A (S220). In other words, it is determined for confirmation following S200 whether or not the discharge from the battery 31 to the tool body 2 is finished.

Here, when it is determined that the discharge current is greater than 0 A and the discharge to the tool body 2 is continuing (S220: YES), the microcomputer 32 again switches the gain of the non-inverting amplifying circuit to the first gain (S230) and the process returns to S150. On the other hand, when the discharge current to the tool body 2 is determined to be 0 A (S220: NO), the discharge is considered to be finished and the process proceeds to S240-S270 in order to determine whether or not conditions for entering a sleep mode are met, in other words, whether or not the battery 31 is in a stable state.

Specifically, it is initially determined, concerning the cell temperature, whether or not an amount of change in the cell temperature dT/dt is less than, for example, 5° C. (S240). If the battery 31 is in a normal state, the cell temperature should gradually drop after the discharge is finished. In an unstable state after the discharge is finished before the battery 31 becomes stable, however, if something abnormal occurs in a battery cell, such as a slight short circuit in the battery cell as described earlier, the cell temperature rises sharply. By conducting the process of S240, it is made possible to detect the abnormality of the battery cell by detecting such a sharp rise in the cell temperature accompanying the abnormality of the battery cell.

When the amount of change in the cell temperature dT/dt is 5° C. or more (S240: NO), the battery cell is determined to be in an abnormal state (abnormality detection) and the monitoring circuit is switched to a no charge/discharge mode (S380) in which both charge and discharge are prohibited. After switched to the no charge/discharge mode, the battery pack 10 is unable to be charged and discharged, whereby a user can no longer use the battery pack 10.

When the amount of change in the cell temperature dT/dt is determined to be less than 5° C. (S240: YES), it is subsequently determined whether or not an amount of change in the cell voltage dV/dt of each of the battery cells is greater than, for example, −100 mV (S250). If, for example, a slight short circuit occurs in a battery cell, the voltage thereof drops sharply. By conducting the process of S250, it is made possible to detect the abnormality of the battery cell by detecting such a sharp drop in the cell voltage accompanying the abnormality of the battery cell.

When the amount of change in the cell voltage dV/dt is determined to be −100 mV or less in any one of the battery cells (S250: NO), in other words, when exhibiting a large declining tendency in the cell voltage, the battery cell is determined to be in an abnormal state and the monitoring circuit is switched to a no charge/discharge mode (S380) in which both charge and discharge are prohibited.

When the amount of change in the cell voltage dV/dt is determined to be greater than −100 mV in all the battery cells (S250: YES), in other words, when exhibiting a small declining tendency in the cell voltage, it is subsequently determined whether or not the amount of change in the cell voltage dV/dt is 0 or less in each of the battery cells (S260). When the amount of change in the cell voltage dV/dt is greater than 0 (S260: NO), in other words, when the cell voltage is rising, it is determined that, although nothing abnormal occurs in the battery cells, the battery 31 is in an unstable state immediately after the discharge is finished, and the process again returns to S150.

On the other hand, when the amount of change in the cell voltage dV/dt is 0 or less, in other words, when it is determined that a rise in the cell voltage after the discharge settles down and that the battery 31 is becoming stable (5260: YES), it is subsequently determined whether or not the cell temperature T is lower than 60° C. (S270). This determination in S270 is different from the determination based on the amount of change in the cell temperature in S240. The determination in S270 is the determination based on the value of the cell temperature itself. When the cell temperature is 60° C. or higher (S270: NO), the battery 31 is determined yet to be in an unstable state, and the process again returns to S150. On the other hand, when the cell temperature is determined to be lower than 60° C. (S270: YES), the microcomputer 32 considers that conditions for switching to a sleep mode are met, and switches the entire monitoring circuit including the microcomputer 32 itself to a sleep mode (S280).

In the sleep mode, various monitoring operations (including a monitoring of the cell voltage, a monitoring of the cell temperature, and a monitoring of the charge/discharge current) performed in the monitoring circuit during the normal operational state are basically stopped, and various controls by the microcomputer 32 are also basically stopped. However, operations required at least to return from the sleep mode to the normal operational state again are continuously performed as described above.

After switched to the sleep mode, if any of the returning conditions are met (S290), the monitoring circuit wakes up from the sleep mode to a normal operational state (S300), and the processes in S110 and thereafter are performed again. The above returning conditions include the condition where discharge from the battery 31 is started, the condition where the battery charger 20 is connected, and the condition where the battery voltage Vbat falls below 25V. In the wake-up process in S300, a process for returning the gain, which has been switched to the second gain in S210, to the first gain is also performed.

For example, in the case where the monitoring circuit is returned from the sleep mode due to the connection of the battery charger 20 to the battery pack 10, the process proceeds from S110 to S120, and the monitoring circuit enters a charge monitoring mode. In the case where the monitoring circuit is returned from the sleep mode due to the decrease in the battery voltage Vbat below 25V, the process proceeds from S110 to S130. In S130, the battery voltage Vbat is determined to be lower than 25V (S130: YES), and the process proceeds to S370, where storage of the data is performed and the monitoring circuit is switched to the shutdown mode.

After switched to the no-discharge mode in S320, the process proceeds to S330, where a determination process which is exactly the same as in S240 is performed. That is, it is determined whether or not the amount of change in the cell temperature dT/dt is less than 5° C. When the amount of change in the cell temperature dT/dt is 5° C. or greater (S330: NO), the battery cell is determined to be in an abnormal state, and the monitoring circuit is switched to the no charge/discharge mode (S380). On the other hand, when the amount of change in the cell temperature dT/dt is determined to be less than 5° C. (S330: YES), the process subsequently proceeds to S340. In S340, a determination process which is exactly the same as in S250 is performed, that is, it is determined whether or not the amount of change in the cell voltage dV/dt is greater than −100 mV in each of the battery cells.

When the amount of change in the cell voltage dV/dt is determined to be −100 mV or less in any one of the battery cells (S340: NO), in other words, when exhibiting a large declining tendency in the cell voltage, the battery cell is determined to be in an abnormal state and the monitoring circuit is switched to the no charge/discharge mode (S380). On the other hand, when the amount of change in the cell voltage dV/dt is determined to be greater than −100 mV in all the battery cells (S340: YES), in other words, when exhibiting a small declining tendency in the cell voltage, the process subsequently proceeds to S350. In S350, a determination process which is exactly the same as in S260 is performed, that is, it is determined whether or not the amount of change in the cell voltage dV/dt is 0 or less in each of the battery cells.

When the amount of change in the cell voltage dV/dt is greater than 0 (S350: NO), the process again returns to S320.

On the other hand, when the amount of change in the cell voltage dV/dt is 0 or less (S350: YES), the process subsequently proceeds to S360. In S360, a determination process which is exactly the same as in S270 is performed, that is, it is determined whether or not the cell temperature T is lower than 60° C.

When the cell temperature is 60° C. or higher (S360: NO), the process again returns to S320. On the other hand, when the cell temperature is determined to be lower than 60° C. (S360: YES), the process proceeds to S370, where storage of the data is performed and the monitoring circuit is switched to the shutdown mode.

(6) Effects of the Above Configuration

According to the battery pack 10 of the present embodiment as described hereinbefore, after the discharge to the tool body 2 is finished (S220: NO), the battery pack 10 is switched to a sleep mode (S280) when each of following conditions are all met: a condition where the amount of change in the cell temperature dT/dt is less than 5° C., which indicates that temperature change becomes stable (S240: YES); a condition where the amount of change in the cell voltage dV/dt is greater than −100 mV in all the battery cells composing the battery 31 (S250: YES) and also 0 or less (S260: YES), which indicates that the cell voltage becomes stable; and a condition where the cell temperature T is lower than 60° C. (S270: YES), which indicates that the temperature becomes stable. Therefore, it is made possible to effectively reduce electric power consumption of the battery 31 while performing necessary and sufficient monitoring of the battery 31 after the discharge to the tool body 2 is finished before the battery 31 becomes stable.

In addition, after the discharge is finished, the microcomputer 32 not only determines whether or not the conditions for switching to the sleep mode are met, but also determines that the battery 31 is in an abnormal state when the cell temperature rises sharply (S240: NO) or the cell voltage drops sharply (S250: NO), and makes the battery pack 10 unusable thereafter. Therefore, it is made possible, if anything abnormal such as a slight short circuit occurs, to accurately detect such an abnormality and appropriately respond thereto while achieving an effective reduction in electric power consumption.

During discharge to the tool body 2, the gain of the non-inverting amplifying circuit including the operational amplifier 37 is set to the first gain. When the discharge to the tool body 2 is finished, the gain is switched to the second gain which is greater than the first gain. Therefore, while the discharge from the battery 31 to the tool body 2 is performed, it is possible to accurately detect the discharge current (comparatively large amount of current of several tens of amperes) during the discharge. After the discharge is finished, even a small amount of current is amplified to a large value with the greater second gain. Therefore, when the discharge is restarted, even if the discharge current is small, for example during low-speed running of the motor, the discharge current can be accurately detected, and the monitoring circuit can be quickly returned from the sleep mode.

In the present embodiment, after switched to the sleep mode, it is continuously determined whether or not the divided battery voltage value Vz falls below the first reference voltage Vr1, and when the voltage value Vz falls below the voltage Vr1, the monitoring circuit is returned from the sleep mode, and further switched to the shutdown mode. In other words, when a remaining battery capacity of the battery 31 is decreased and the battery voltage falls below 25V, the monitoring circuit is switched to the shutdown mode, and the discharge from the battery 31 is completely stopped (except for natural discharge). It is thereby possible to inhibit the battery 31 from going into an overdischarge state.

(7) Other Configurations

It should be understood that the above configurations of the present invention are not so limited and may take various forms while still falling within the scope pertinent to the present invention.

For example, as the conditions for switching the monitoring circuit to the sleep mode after the discharge is finished, it is possible to adopt various combinations of the above conditions (S240-S270) for switching the monitoring circuit to the sleep mode. For example, the monitoring circuit may be switched to the sleep mode only under the condition where the amount of change in the cell temperature dT/dt is less than 5° C. (S240: YES), which indicates that temperature is stable; only under the condition where the amount of change in the cell voltage dV/dt is greater than −100 mV in all the battery cells (S250: YES), which indicates that the voltage is stable; or only under the condition where both of the above S240 and 5250 are met. Alternatively, other conditions may be further added to the conditions S240 through S270 to determine whether or not to switch the monitoring circuit to the sleep mode.

It is more preferable, however, that the determination is made based on the above necessary and sufficient conditions shown in S240 through S270 of the above embodiment in order to steadily continue the monitoring operations while the battery 31 is in an unstable state immediately after the discharge is finished, and also to effectively reduce electric power consumption by quickly switching the monitoring circuit to the sleep mode after the battery 31 goes into a stable state.

As a specific reference value in each of the determination processes 5240 through S270, each value in FIG. 5B (5° C. in S240, −100 mV in S250, 0 in S260, and 60° C. in S270) is set by way of example only, and different values may be set as appropriate. The same applies to a reference value in each of other determination processes S130, S140, S160, S170, S180, S200, S220, and S330 through S360.

In the above embodiment, the gain of the non-inverting amplifying circuit including the operational amplifier 37 is made switchable into one of the two gains with the gain switch signal from the microcomputer 32. However, the gain may be configured to be switchable into one of three or more gains, or may be configured to be continuously variable.

In the above embodiment, the signal from the operational amplifier 37 is inputted to the comparator 36. However, a voltage signal on an upstream side of the resistor R1 (i.e., a signal inputted to the operational amplifier 37) may be also inputted to the comparator 36.

In the above embodiment, it has been described that the monitoring circuit in the battery pack 10 is configured as a whole by each circuit shown in FIG. 3 including the microcomputer 32. However, a circuit dedicated to monitoring (e.g., a dedicated IC and the like) may be provided, for example, separately from the microcomputer 32. During the sleep mode, the operation of the dedicated IC and the like may be stopped by stopping supplying power to the dedicated IC and the like, while the microcomputer 32 may be operated with low power consumption, for example by limiting its function only to monitoring whether or not the returning conditions from the sleep mode are met.

In the above embodiment, the battery 31 is configured by ten battery cells connected in series by way of example only. However, the number of the battery cells composing the battery 31 is not specifically limited, and the battery 31 may include only one battery cell or may be configured by a plurality of battery cells connected in series-parallel. It should be understood that the voltage of each battery cell and the battery voltage are also not limited to the values exemplified in the above embodiment.

In the above embodiment, the lithium-ion rechargeable battery is exemplified as each of the battery cells composing the battery 31 by way of example only. However, a non-rechargeable battery or a battery other than the lithium-ion rechargeable battery may also be applied to the present invention as battery cells.

What is claimed is:

1. A battery pack for power tool comprising:
   a battery that includes at least one battery cell;
   a monitoring circuit that monitors a status of the battery, the monitoring circuit being operated by receiving power supply from the battery;
   a sleep mode switching unit that switches the battery pack to a sleep mode by stopping at least a part or all of operations of the monitoring circuit if the monitoring circuit detects a discharge end state where a discharge current from the battery is equal to or lower than a predetermined set current value, and the monitoring circuit further detects at least one of a voltage stable state where a voltage change amount in the battery cell is within a predetermined stable range of voltage change amount and a temperature stable state where a temperature change amount in the battery is within a predetermined stable range of temperature change amount,
   wherein in a normal operational state of the monitoring circuit, the monitoring circuit detects an abnormality of the batter cell if a temperature change amount in the batter cell is equal to or greater than a redetermined value or if the voltage change amount in the batter cell is equal to or greater than a predetermined value.

2. The battery pack for power tool according to claim 1, wherein
   the monitoring circuit detects the voltage stable state when the voltage change amount in all battery cells included in the battery are within the stable range of voltage change amount.

3. The battery pack for power tool according to claim 1, wherein
   the sleep mode switching unit switches the battery pack to the sleep mode when the monitoring circuit detects the discharge end state and further detects both of the voltage stable state and the temperature stable state.

4. The battery pack for power tool according to claim 3, wherein
   the sleep mode switching unit switches the battery pack to the sleep mode when the monitoring circuit detects the discharge end state and further detects both of the voltage stable state and the temperature stable state, and also detects that a temperature of the battery is lower than a predetermined temperature threshold.

5. The battery pack for power tool according to claim 1, comprising:
   a mode returning unit that returns the battery pack from the sleep mode to a normal operational state when, after the battery pack is switched to the sleep mode by the sleep mode switching unit, a predetermined mode returning condition is met in the battery pack.

6. The battery pack for power tool according to claim 5, wherein
the mode returning unit includes a discharge start detecting unit that detects that a discharge from the battery is started, and the mode returning unit performs processing to return the battery pack from the sleep mode to the normal operational state as a processing to be performed when the mode returning condition is met.

7. The battery pack for power tool according to claim 1, wherein
the monitoring circuit includes at least a discharge current detecting unit that detects a discharge current from the battery, a cell voltage detecting unit that detects a voltage of the battery cell, and a temperature detecting unit that detects a temperature of the battery, and the monitoring circuit monitors the status of the battery based on a detection result obtained by each detecting unit.

8. The battery pack for power tool according to claim 7, comprising:
a cell selecting switch that selectively outputs a voltage of at least one of the battery cells included in the battery; and
an amplifying unit that amplifies and outputs the voltage of the at least one of the battery cells selected by the cell selecting switch,
wherein the cell voltage detecting unit detects the voltage of the battery cell based on a signal outputted from the amplifying unit.

9. The battery pack for power tool according to claim 1, comprising a mode returning unit, wherein
the mode returning unit includes a discharge start detecting unit that detects that a discharge from the battery is started, and the mode returning unit returns the battery pack from the sleep mode to the normal operational state when, after the battery pack is switched to the sleep mode by the sleep mode switching unit, the discharge start detecting unit detects that the discharge is started,
the monitoring circuit includes a discharge current detecting unit that detects a discharge current from the battery,
the discharge current detecting unit includes a signal obtaining unit that obtains an electric signal corresponding to an amount of the discharge current, and a signal amplifying unit that amplifies the electric signal obtained by the signal obtaining unit with a predetermined first gain; and the discharge current detecting unit is configured to continue an operation after the battery pack is switched to the sleep mode by the sleep mode switching unit,
the discharge start detecting unit is configured to detect that the start of the discharge based on the electric signal amplified by the signal amplifying unit, and
further comprising a gain switching unit that switches a gain of the signal amplifying unit to a second gain which is greater than the first gain when the monitoring circuit detects the discharge end state.

10. The battery pack for power tool according to claim 7, comprising a mode returning unit, wherein
the mode returning unit includes a discharge start detecting unit that detects that a discharge from the battery is started, and the mode returning unit returns the battery pack from the sleep mode to the normal operational state when, after the battery pack is switched to the sleep mode by the sleep mode switching unit, the discharge start detecting unit detects that the discharge is started,
the discharge current detecting unit includes a signal obtaining unit that obtains an electric signal corresponding to an amount of the discharge current, and a signal amplifying unit that amplifies the electric signal obtained by the signal obtaining unit with a predetermined first gain; and the discharge current detecting unit is configured to continue an operation after the battery pack is switched to the sleep mode by the sleep mode switching unit,
the discharge start detecting unit is configured to detect that the discharge is started based on the electric signal amplified by the signal amplifying unit, and
further comprising a gain switching unit that switches a gain of the signal amplifying unit to a second gain which is greater than the first gain when the monitoring circuit detects the discharge end state.

11. The battery pack for power tool according to claim 9, wherein
the gain switching unit again switches the gain to the first gain when, after switching the gain to the second gain, the discharge start detecting unit detects that the discharge is started.

12. The battery pack for power tool according to claim 10, wherein
the gain switching unit again switches the gain to the first gain when, after switching the gain to the second gain, the discharge start detecting unit detects that the discharge is started.

13. The battery pack for power tool according to claim 5, comprising:
a battery voltage determining unit, that can operate in the sleep mode, and that determines whether or not the voltage of the battery falls below a predetermined lower limit of a voltage threshold range, and
a shutdown mode switching unit, that is operated in the normal operational state, and that switches the battery pack to a shutdown mode, in which an electric power consumption of the battery is less than that in the sleep mode, when the battery voltage determining unit determines that the voltage of the battery falls below the lower limit of the voltage threshold range,
wherein, when the battery voltage determining unit determines that the voltage of the battery falls below the lower limit of the voltage threshold range, the mode returning unit performs a processing to return the battery pack from the sleep mode to the normal operational state as a processing to be performed when the mode returning condition is met.

14. The battery pack for power tool according to claim 5, comprising:
a charge detecting unit that detects that a battery charger for charging the battery is connected to the battery pack,
wherein, when the charge detecting unit detects that the battery charger is connected, the mode returning unit performs a processing to return the battery pack from the sleep mode to the normal operational state as a processing to be performed when the mode returning condition is met.

15. A power tool comprising:
a battery pack for power tool and a tool body,
wherein the battery pack includes:
a battery that has at least one battery cell;
a monitoring circuit that monitors a status of the battery, the monitoring circuit being operated by receiving power supply from the battery; and
a sleep mode switching unit that switches the battery pack to a sleep mode by stopping at least a part or all of operations of the monitoring circuit if the monitoring circuit detects a discharge end state where a discharge current from the battery is equal to or lower than a predetermined set current value, and the monitoring circuit further detects at least one of a voltage stable state where a voltage change amount in the battery cell is within a predetermined stable range of voltage change amount and a temperature stable state where a temperature change amount in the battery is within a predetermined stable range of temperature change amount, wherein in a normal operational state of the monitoring circuit, the monitoring circuit detects an abnormality of the batter cell if a temperature change amount in the batter cell is equal to or greater than a redetermined value or if the voltage change amount in the batter cell is equal to or greater than a predetermined value, and wherein the tool body is configured so that the battery pack is detachably attached thereto and configured so as to be operated by receiving power supply from the battery pack.

* * * * *